United States Patent Office 2,948,662
Patented Aug. 9, 1960

2,948,662
CHEMICAL PROCESS

Frederick James Bellringer, Leatherhead, England, assignor to The Distillers Company Limited, Edinburgh, Scotland, a company of Great Britain No Drawing. Filed May 7, 1957, Ser. No. 657,490

Claims priority, application Great Britain June 2, 1956

8 Claims. (Cl. 202—57)

The present invention relates to the stabilisation of chloroprene.

The tendency of chloroprene to polymerise under the influence of light or heat is well known. Polymerisation is particularly liable to occur in purification processes, for instance when impure chloroprene is being distilled, thus reducing the yield of chloroprene. Even on standing, particularly under the influence of light, chloroprene is apt to polymerise.

It has now been discovered that the adventitious polymerisation of chloroprene can be effectively inhibited by contacting it with nitric oxide, having the formula NO.

Accordingly, the present invention comprises the process of stabilising chloroprene with nitric oxide and the resulting chloroprene in admixture with nitric oxide as a stabilizer.

The presence of nitric oxide effectively inhibits the adventitious polymerisation of chloroprene both in the liquid phase and in the vapour phase. Nitric oxide is particularly effective in preventing the polymerisation of chloroprene in the vapour phase, for instance when it is being distilled. Many of the conventional stabilising agents, although effective in preventing the polymerisation of the liquid chloroprene in the kettle of a still, do not prevent the formation of polymer from chloroprene in the vapour phase in the still itself. By mixing the chloroprene vapour in the still with traces of nitric oxide, preferably in the presence of an inert gaseous diluent such as nitrogen carbon dioxide, helium, argon and the like, such polymerisation is substantially prevented. Suitably, nitrogen containing traces of nitric oxide is bubbled through the kettle, or is introduced into the distillation vessel directly above the surface of the distilland. In addition to preventing polymerisation in the vapour phase small amounts of the nitric oxide dissolve in and stabilize the distillate.

The amount of nitric oxide which is effective is not critical. In the case of liquid chloroprene the very small amount of nitric oxide which is soluble in the chloroprene at normal temperatures and pressures is sufficient to prevent polymerisation. In the case of gaseous chloroprene, again only traces of nitric oxide are required. In general amounts of about 0.01% by volume of nitric oxide are sufficient to stabilise the chloroprene.

It has been found, surprisingly, that chloroprene stabilised with nitric oxide can be polymerised under the normal polymerisation reaction conditions without having first to remove the nitric oxide stabiliser. This contrasts with prior art stabilisers which normally have to be removed before a satisfactory polymerisation reaction can be obtained.

The following examples are given further to illustrate the process of the present invention.

Example 1

A series of tests were carried out in which samples of pure chloroprene were refluxed in the absence of light in boiling tubes immersed in an oil-bath. Inhibitors were added to each in a concentration of 0.1% w./v., where soluble inhibitors were used; nitric oxide was passed into one tube below the surface of the chloroprene by passing a slow stream of nitrogen through a saturated solution of nitric oxide in ferrous sulphate. The results obtained are summarised in the following table:

| Inhibitor used: | Time (hrs.) of onset of polymerisation |
|---|---|
| None | 9. |
| Hydroquinone | 14. |
| Phenol | 9. |
| Copper wire | 11. |
| Sodium nitrite | 11. |
| Diphenylamine | 11. |
| Diethylamine | 2. |
| Sulphur | 9. |
| Benzidine | 1. |
| β-Phenyl naphthylamine | 1. |
| Methylene Blue | 1. |
| t-Butyl catechol | 1. |
| Picric acid | 1. |
| 50/50 t-butyl catechol + phenothiazine | 48. |
| Nitrogen + nitric oxide (NO) | None after 54 hrs. |

A strictly comparative test was carried out in which no inhibitor was added but nitrogen was passed through the chloroprene. The onset of polymerisation commenced in 4 hours.

Example 2

Impure chloroprene obtained by the alkaline dehydrochlorination of 3:4-dichlorbutene-1, containing as impurities traces of 1-chlorobutadiene and 3:4-dichlorbutene-1 was dried and fractionated at normal pressure in the absence of light through a 5 ft. x 1" Fenske helices packed column; 0.25% of a 50/50 mixture of p-tert. butyl catechol and phenothiazine was added to the kettle. Nitrogen containing nitric oxide (NO) was passed into the kettle and the chloroprene was fractionated at a 10/1 reflux ratio over a period of 20 hours. At the end of this time, when the kettle residue was very small, polymer formation was not detectable.

By way of comparison when the same impure chloroprene was fractionated in a 3 ft. x 1" Fenske helices packed column with 0.25% of said mixture of p.-tert. butyl catechol and phenothiazine in the absence of nitric oxide polymer was noticed in the kettle after two hours and after six hours the loss due to polymer formation was 25% of the charge.

I claim:

1. Chloroprene in admixture with nitric oxide, having the formula NO, as a stabiliser.

2. Chloroprene in admixture with at least 0.01% by volume of nitric oxide, having the formula NO as a stabiliser.

3. The process for the stabilisation of chloroprene which comprises incorporating therewith at least 0.01% by volume of nitric oxide, having the formula NO.

4. The process for the distillation of chloroprene which comprises carrying out the distillation in the presence in the vapour phase in the still of nitric oxide, having the formula NO.

5. The process as claimed in claim 4 wherein the nitric oxide is introduced into the still in admixture with an inert gaseous diluent.

6. The process as claimed in claim 5 wherein the diluent is nitrogen.

7. Chloroprene in admixture with nitric oxide, having the formula NO, and nitrogen as a stabiliser.

8. The process which comprises distilling impure chloroprene containing 1-chlorobutadiene and 3:4-dichlorbutene-1 as impurities, in the presence in the still of nitric oxide, having the formula NO.

References Cited in the file of this patent

UNITED STATES PATENTS

| | | |
|---|---|---|
| 2,407,861 | Wolk | Sept. 17, 1946 |
| 2,616,935 | Boatright et al. | Nov. 4, 1952 |
| 2,730,489 | Lewis | Jan. 10, 1956 |
| 2,741,583 | Vaughan | Apr. 10, 1956 |
| 2,886,493 | Mecorney | May 12, 1959 |

OTHER REFERENCES

Carothers et al.: J.A.C.S. 53, 4214 (1931).

Kharasch et al.: "Inhibition of Polymerization," Ind. & Eng. Chem., vol. 39, No. 7 (July 1947), pp. 830–37.